Dec. 27, 1949 A. E. GOLDFARB 2,492,571
EDUCATIONAL DEVICE
Filed May 11, 1946 2 Sheets-Sheet 1
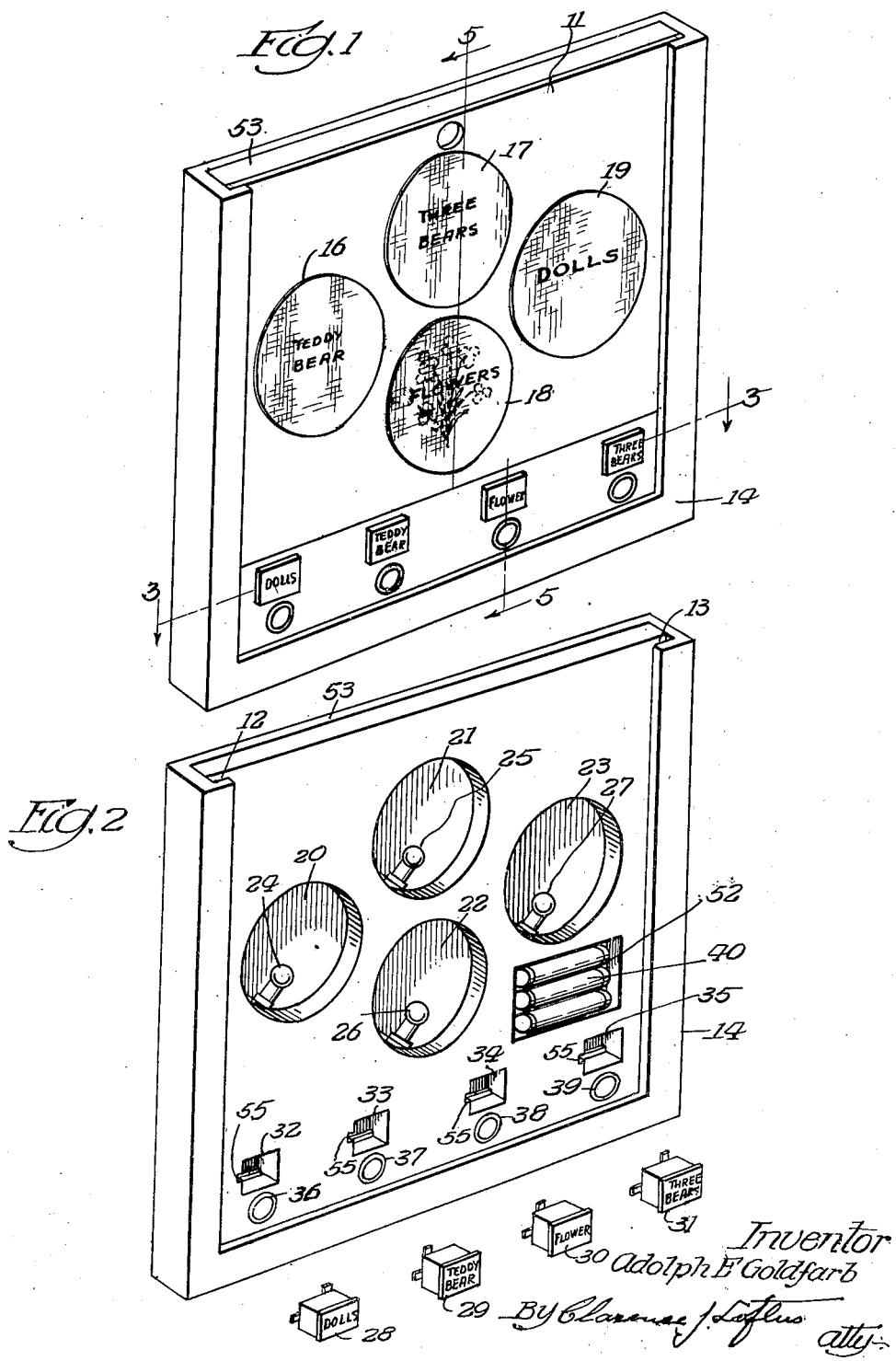

Dec. 27, 1949     A. E. GOLDFARB     2,492,571
EDUCATIONAL DEVICE
Filed May 11, 1946     2 Sheets-Sheet 2
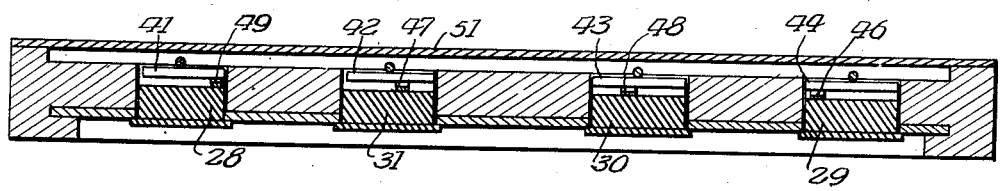
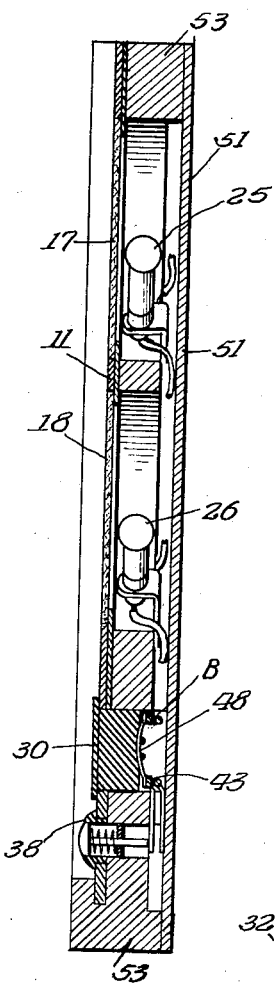
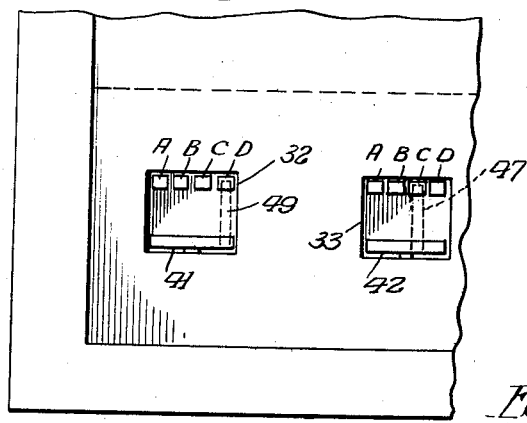
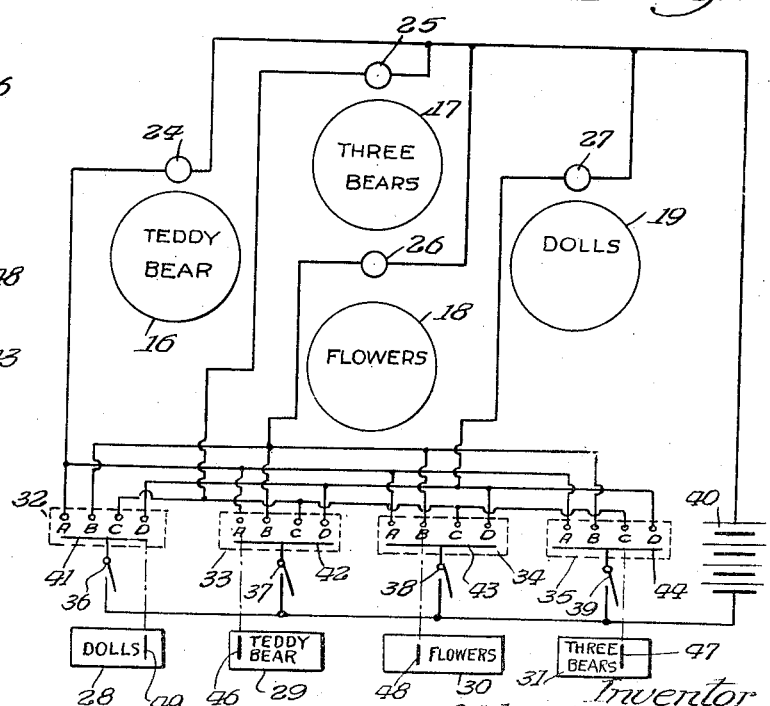

Patented Dec. 27, 1949

2,492,571

UNITED STATES PATENT OFFICE 2,492,571

EDUCATIONAL DEVICE

Adolph E. Goldfarb, Chicago, Ill.

Application May 11, 1946, Serial No. 669,114

2 Claims. (Cl. 35—35)

The present invention relates to educational devices and particularly to educational aids of the visual type. While it is intended primarily to be used in pedagogy, it is also of utility as an amusement device.

It is well known among parents and teachers that children are very fond of bright colors and simple objects, that they derive much enjoyment from play with blocks, that they are deeply interested in simple puzzles, and that they are prone to experiment with mechanical and electrical devices. Although these propensities of children often result in injury to themselves and damage to household appliances, they may be turned into constructive channels, wherein their free pursuit contributes both to the welfare of the children and to the comfort of those having custody of them. It is an object of the present invention to provide a simple, inexpensive educational device which fully exploits these well-known characteristics of the young, which is safe in handling, which brings amusement and educational benefits to children and at the same time solves problems presented to their custodians.

It is also well known to psychologists that association of ideas is one of the most effective means by which to acquire and to retain useful knowledge. This phenomenon is exemplified in children's toy blocks of the alphabetical type. They couple the objective embodiment of the letter to the child's interest in the block, thereby to stimulate in him an association of the spoken letter with the objective embodiment on the block. It is, accordingly, an object of the present invention to provide an educational device which not only beneficially exploits the above-mentioned customs of children but which also stimulates in their minds an association between a visual object and a related object or word.

The bent of the adult members of families to play with children's toys and educational aids is equally notorious, as is also the utility of children's visual educational aids in adult education. Other objects of my invention contemplate the providing of an educational device which will satisfy these tendencies of the adult.

Other objects of my invention will become apparent from a written description of the accompanying drawings, in which there is illustrated a preferred form of educational device in accordance with my invention. In the drawings:

Fig. 1 is a perspective view of the device, assembled and ready for use;

Fig. 2 is a similar perspective view, showing the support member as it appears when the panel is removed and showing the individual manually operable electrical contactors in positions withdrawn from the socket on the support;

Fig. 3 is an end elevational sectional view, taken along line 3—3 of Fig. 1, looking in the direction of the arrows;

Fig. 4 is a detailed and fragmentary view of the contactors provided on the Fig. 1 embodiment;

Fig. 5 is a side elevational sectional view, taken along the line 5—5 of Fig. 1, looking in the direction of the arrows, and showing the details of two of the lamps and one of the contactor elements; and Fig. 6 is a wiring diagram showing the electrical circuit arrangements of the Fig. 1 embodiment.

The general construction and operation of the educational device provided in accordance with my invention are very simple. A removable cardboard panel 11 is placed in slots 12—13 of a wooden support member 14. The panel has a plurality of translucent windows 16, 17, 18, and 19, made of thin paper. On the rear sides of the windows are painted objective embodiments or pictures of several animals or other things. For purposes of illustration I have chosen a teddy bear, three bears, flowers and dolls. Any other objects, such as large alphabetical letters, may be chosen. The windows normally conceal the objects and are individually placed in registry with lamp-wells 20, 21, 22, and 23, respectively, in which are placed lamps 24, 25, 26 and 27. When any one of the lamps glows the light passes through the window and the associated object is illuminated and revealed.

The child is told to find the three bears, for example. His curiosity is immediately aroused, since he sees none of the objects. He is also informed that he should find the right one of the contactor blocks 28, 29, 30 or 31, and insert it in any one of the sockets 32, 33, 34, or 35. His instincts for solving puzzles and handling blocks then come into play, because only one of the four blocks will, when inserted in a socket, close the circuit for the lamp 25, which illuminates the three bears. He makes a selection from among the blocks and eventually finds the proper one, in this instance, block 31, and inserts it in one of the sockets, say socket 35. Still, the object is not illuminated. His inclination for experimenting is now satisfied by depressing the push-button immediately below the inserted block, say push-button 39. Now his curiosity is aroused as to why the use of block 31 permitted him to see the three bears while the use of the other blocks did not. He notes that the obvious difference between that block and the other blocks is that block 31 has the words "Three bears" inscribed thereon. Thus all of these tendencies of children are fully exploited in stimulating in the child a mental association of the picture of the three bears, an objective embodiment of one idea, and the words "Three bears" an objective embodiment of a related idea.

Similarly the user must use block 28 if he wants to see the dolls, and blocks 29 and 30 for the teddy bear and flowers, respectively. Further, several panels and several sets of blocks can be provided, each block being effective in causing the illumination of an object associated with the word inscribed thereon. In the alternative, one set of blocks and several sets of removable namecards, one set of cards for each panel may be used. And the number of objects on the panel can be increased, as desired, so that an aid in teaching the whole alphabet may be provided by painting large letters behind the windows and inscribing small letters on the blocks.

The usual mode of operation of my educational device involves the placement of all of the connectors in their sockets as shown in Fig. 1. If the connectors are so arranged, the user sees the illuminated dolls only when he presses button 36, for example. If the connectors are so placed, a child will rapidly determine that he can illuminate the dolls by pressing on button 36, the teddy bear by pressing on button 37, the flowers by depressing button 38, and the three bears by depressing button 39. However, if the connectors are interchanged and the child presses on the same buttons as before, he will see different objects. If, for example, connector 30 is placed in socket 35, he will see the flowers rather than the three bears when he depresses button 39. By interchanging the connectors, a parent or teacher can show the child that he can illuminate the object which he desires to see by one method only, and that is by depressing the button under the connector which carries the word for that object. Thus the curiosity of the child drives him to acquire knowledge concerning the words for the objects he desires to see and the operation of my device assures that he must acquire that knowledge before he can be certain that he will see that object.

It will be understood that when connector 28, for example, is placed in any one of the four sockets, depression of the push-button under the socket used will cause the dolls to be illuminated. The other connectors have similar operations.

Referring now specifically to Fig. 6 of the drawings there are shown a plurality of normally-open individual lamp circuits, each of which is adapted to be closed by one of the block-shaped contactors 28, 29, 30 or 31, and to permit the illumination of one of the windows 19, 16, 18 or 17, respectively. The circuit for lamp 24 (teddy bear) comprises an electric-current source or low voltage battery 40, that one of push-button switches 36, 37, 38 or 39 which is immediately below the socket into which contactor 29 is inserted, that one of contact bars 41, 42, 43 or 44 which is in that socket, the spring-contact 46 of contactor 29, that one of the four terminals A which is in the socket used, and lamp 24. The circuit for lamp 25 (three bears) comprises the source, that one of the push-button switches which is below the socket into which contactor 31 is inserted, that one of the contact bars which is in that socket, the spring contact 47 of contactor 31, that one of the four terminals C which is in the socket so used, and lamp 25. The circuit for lamp 26 (flowers) comprises the source, that one of the push-button switches which is below the socket in which contactor 30 is inserted, that one of the contact bars which is in that socket, the spring contact 48 of contactor 30, that one of the four terminals B which is in that socket, and lamp 26. The circuit for lamp 27 (dolls) similarly comprises the source, that one of the push-buttons which is located below the socket in which the contactor 28 is inserted, that one of the contact bars which is located in that socket, the spring contact 49 of contactor 28, that one of the four terminals D which is located in that socket so used, and lamp 27. The terminals marked A are connected together and the terminals marked B, C, and D are similarly arranged. The terminals are placed in like sequential groups in each of the sockets 32, 33, 34, and 35. A contact bar 41, 42, 43, or 44 is provided in each socket. The socket terminals are permanently placed in the lamp circuits. The contactor device 29 is complementary to the contactor devices 41—A, 42—A, 43—A and 44—A, but is non-complementary to the contactor devices including the terminals B, C, and D. Similarly, the contactor device 28 is complementary only to contactor devices 41—D, 42—D, 43—D and 44—D. The contactor device 30 is complementary to the contactor devices 41—B, 42—B, 43—B, and 44—B. And the contactor device 31 is complementary only to the contactor devices 41—C, 42—C, 43—C, and 44—C. The word "complementary" is here used in the electrical sense and involves cooperation to close a circuit. Thus it will be seen that only contactor 28 will permit the lighting of lamp 27 (dolls) when inserted in a socket and when the push-button immediately below that socket is depressed. The word "dolls" is inscribed thereon. For that purpose, removable cards may be employed. The operation of contactors 29 (teddy bear), 30 (flowers) and 31 (three bears) will be apparent in the light of the foregoing description.

The details of the contactors are shown in Fig. 3. Each comprises a plywood block having a spring metal contact secured thereto. Each carries a card on which a word is inscribed. The contactors differ only in the locations of their metal contacts, as clearly shown in Figs. 2, 3, and 4.

The details of the sockets are shown in Fig. 4. The blocks and sockets are provided with grooves 55, so that the blocks can not be inserted in the sockets upside down. Under the conditions illustrated in Fig. 4, the dolls and the three bears can be illuminated by depressing push-buttons 36 and 37, respectively. It would be seen that the contacts on the contactor close the circuit between a contact bar and the appropriate one of the terminals A, B, C or D.

The terminals are secured to an appropriate plywood base 53 and the battery is placed in a well 52 in base 53. The battery is preferably of a low-voltage type. The wiring is located between the back-board 51 and the base 53. The base is glued to the support member and the back-board 51 is tacked thereto, to permit ready access to the wiring. The construction is simple and inexpensive.

While there has been shown and described what is at present regarded as the preferred embodiment of the invention, it will be obvious to those skilled in the art that various changes and substitutions of equivalents may be made therein without departing from the true scope of the invention and it is, accordingly, intended in the appended claims to cover all such changes as fall within the proper scope of the invention and outside of the proper scope of the prior art.

Having thus described my invention, I claim:

1. An educational device for stimulating association of ideas comprising, in combination, a plurality of objects and a like plurality of parallel lamp circuits for illuminating said objects; together with a plurality of connector stations, said connector stations being spaced apart from each other in different locations with respect to the plurality of objects, at least one terminal of each of the illuminating lamp circuits extending to each of the connector stations, with the terminals of each circuit similarly positioned in each of the connector stations; together with a plurality of separable interchangeable circuit-closure members of the same size, shape and configuration but with different identifying indicia inscribed thereon; the different indicia of the several circuit-closure members being associated with the several different objects, and at least one contact element on each circuit-closure member to close the illuminating circuit to the object associated with the indicia appearing on that particular circuit-closure member.

2. An educational device in accordance with claim 1 in which the connector stations comprise an open front socket and the closure members consist of a plug adapted to fit in and be received by the socket.

ADOLPH E. GOLDFARB.

REFERENCES CITED

The following references are of record in the file of this patent:

UNITED STATES PATENTS

| Number | Name | Date |
| --- | --- | --- |
| 1,393,822 | Parker | Oct. 18, 1921 |
| 1,451,569 | Frederick | Apr. 10, 1923 |
| 1,617,272 | Peterson | Feb. 8, 1927 |
| 1,932,994 | Tucker | Oct. 31, 1933 |
| 2,050,805 | Pumar | Aug. 11, 1936 |